(12) United States Patent
Konno et al.

(10) Patent No.: US 7,431,374 B2
(45) Date of Patent: Oct. 7, 2008

(54) WHEELED VEHICLE WITH COVERS

(75) Inventors: Toshihiko Konno, Shizuoka (JP); Hirofumi Hasegawa, Shizuoka (JP); Yuichi Ooi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 119 days.

(21) Appl. No.: 11/130,900

(22) Filed: May 17, 2005

(65) Prior Publication Data

US 2006/0037798 A1   Feb. 23, 2006

(30) Foreign Application Priority Data

Aug. 17, 2004   (JP) .............................. 2004-237488

(51) Int. Cl.
  *B62J 17/06* (2006.01)
(52) U.S. Cl. ..................................... 296/78.1; 296/198
(58) Field of Classification Search ............... 296/78.1, 296/198, 136.07, 153.5, 848, 154, 181.2, 296/901.01; 280/153.5, 848, 154, 858, 850
See application file for complete search history.

(56) References Cited

U.S. PATENT DOCUMENTS

| | | | | |
|---|---|---|---|---|
| 1,584,518 A * | 5/1926 | Drake | | 150/166 |
| 4,169,608 A * | 10/1979 | Logan | | 280/848 |
| 4,178,033 A * | 12/1979 | Muth et al. | | 296/78.1 |
| 4,198,093 A * | 4/1980 | Muth et al. | | 296/78.1 |
| 4,447,067 A * | 5/1984 | Yamashita | | 280/848 |
| 4,682,809 A * | 7/1987 | Huss | | 296/181.2 |
| 4,818,012 A * | 4/1989 | Kohama et al. | | 296/78.1 |
| 5,044,688 A * | 9/1991 | Jacobson | | 296/136.07 |
| 5,139,306 A * | 8/1992 | Ott et al. | | 296/198 |
| 6,205,642 B1 * | 3/2001 | Czirmer | | 29/525.13 |
| 6,209,940 B1 * | 4/2001 | Jocher et al. | | 296/29 |
| 6,293,617 B1 * | 9/2001 | Sukegawa | | 296/203.03 |
| 6,409,257 B1 * | 6/2002 | Takashina et al. | | 296/209 |
| 6,416,112 B1 * | 7/2002 | Trivits | | 296/136.07 |
| 6,641,191 B1 * | 11/2003 | Berger et al. | | 296/29 |
| 6,755,155 B2 * | 6/2004 | May | | 119/400 |
| 6,948,753 B2 * | 9/2005 | Yoshida et al. | | 296/1.08 |
| 7,032,948 B2 * | 4/2006 | Khan | | 296/78.1 |
| 2004/0036250 A1 * | 2/2004 | Kofuji | | 280/276 |
| 2007/0029842 A1 * | 2/2007 | Gade et al. | | 296/209 |

FOREIGN PATENT DOCUMENTS

FR   2575990   *   7/1986
JP   2003-063470      3/2003

* cited by examiner

*Primary Examiner*—Dennis H Pedder
(74) *Attorney, Agent, or Firm*—Keating & Bennett, LLP

(57) ABSTRACT

A wheeled vehicle includes front and rear wheels. A frame supports the wheels. First and second covers cover the wheels or the frame. The first cover includes a first ridge. The second cover includes a second ridge that lies on top of the first ridge. A fastener fastens the first cover or the second cover to the frame in a first direction in which the second cover is placed onto the first cover.

17 Claims, 8 Drawing Sheets

WHEELED VEHICLE WITH COVERS

PRIORITY INFORMATION

The present application is based on and claims priority under 35 U.S.C. § 119 to Japanese Patent Application No. 2004-237488, filed on Aug. 17, 2004, the entire contents of which are expressly incorporated by reference herein.

BACKGROUND OF THE INVENTION

1. Field of the Invention

The present invention relates to a wheeled vehicle including covers, and more particularly to a wheeled vehicle including multiple covers that overlap one another.

2. Description of Related Art

Wheeled vehicles such as, for example, scooters and mopeds typically have a frame that supports front and rear wheels, an engine unit, a seat and other components. Typically, the frame is covered with multiple covers. A front cover is positioned in front of a frame portion that supports a steering shaft. A bottom cover can extend rearward from a bottom of the front cover. The front and bottom covers can prevent water, dirt and other substances kicked up by the front wheel from scattering rearward. For example, Japanese Patent Publication No. P2003-63470A discloses such front and bottom covers.

In one arrangement, a bottom portion of the front cover overlaps a top portion of the bottom cover. The front cover and the bottom cover can be independently coupled with another cover by fasteners such as, for example, bolts.

Because the covers are usually made of resin, dimensional variations due to tolerance may occur when the covers are formed. Such dimensional variations due to tolerance create spaces (or openings) between the overlapped portions of the covers. The spaces not only adversely affect the appearance of the vehicle but also permit small substances to enter inside of the covers.

The bottom portion of the front cover and the top portion of the bottom cover may include ridges. One of the ridges may lie on top of another ridge when the covers are overlapped. Due to such these structures, the spaces may be larger. The larger spaces further adversely affect the appearance of the vehicle and increase the chances that small substances will enter inside of the covers.

SUMMARY OF THE INVENTION

To overcome the problems described above, preferred embodiments of the present invention provide a wheeled vehicle including multiple covers that reduce the likelihood that a space will exist between overlapped portions of the covers.

A preferred embodiment of the present invention provides a wheeled vehicle including front and rear wheels. A frame is arranged to support the front and rear wheels. First and second covers are arranged to cover the wheels or the frame. The first cover includes a first ridge. The second cover includes a second ridge that lies on top of the first ridge. A fastener attaches the first or second cover to the frame in a first direction in which the second cover is placed onto the first cover.

In accordance with another preferred embodiment of the present invention, a wheeled vehicle includes front and rear wheels. A frame is arranged to support the front and rear wheels. First and second covers are arranged to cover the wheels or the frame. The first cover includes a set of first ridges. The second cover includes a set of second ridges that lie on top of the respective first ridges. A plurality of fasteners attaches the first or second cover to the frame in a direction in which the second cover is placed onto the first cover.

In accordance with a further preferred embodiment of the present invention, a method is provided for fastening a plurality of covers to a frame of a wheeled vehicle. The method includes the steps of positioning a first cover that includes a first ridge, positioning a second cover that includes a second ridge such that the second ridge lies on top of the first ridge, and fastening the first or second cover to the frame in a direction in which the second cover is placed onto the first cover.

These and other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
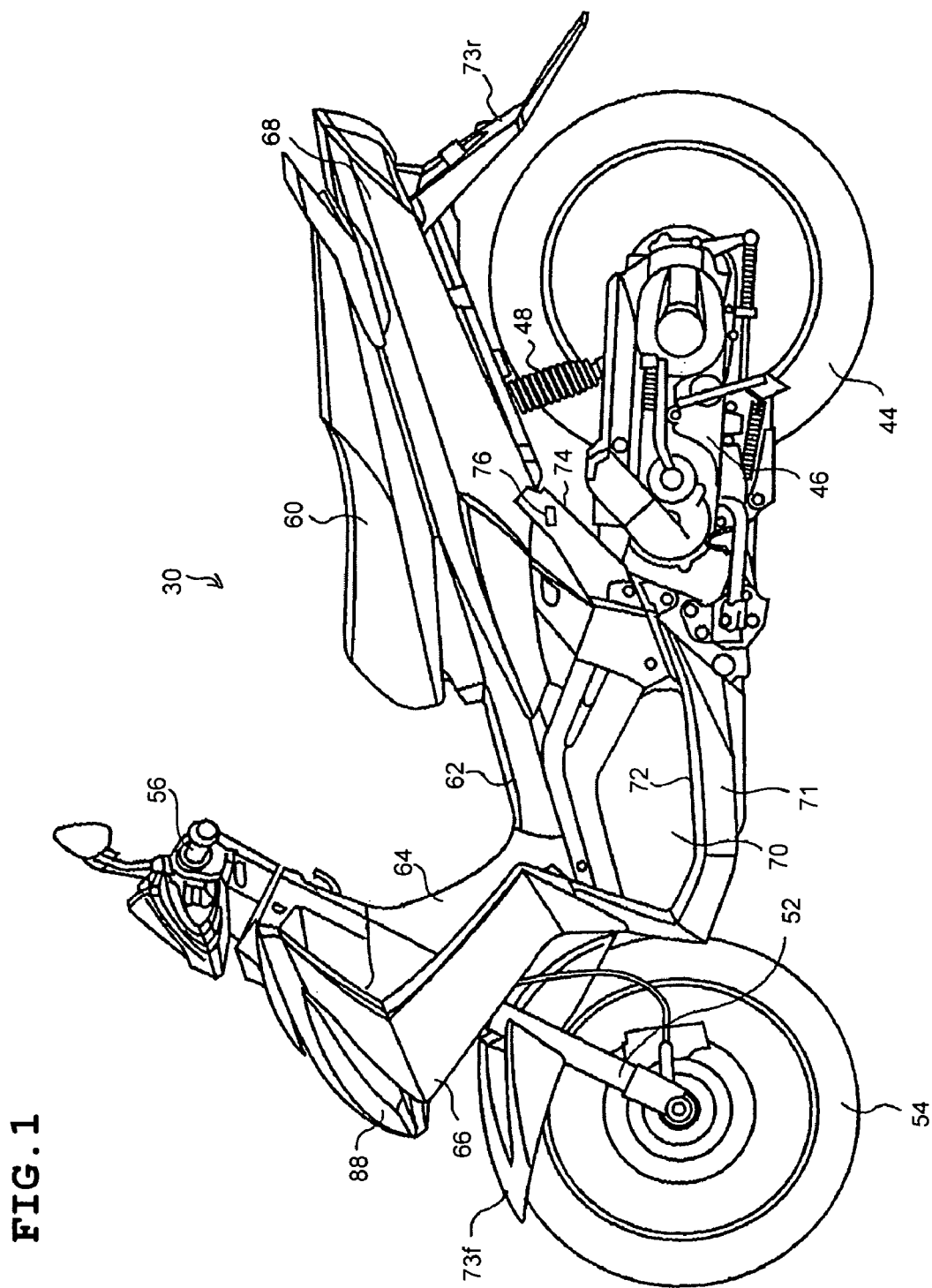
FIG. 1 illustrates a side elevation view of a moped configured in accordance with a preferred embodiment of the present invention.
Figure 2:
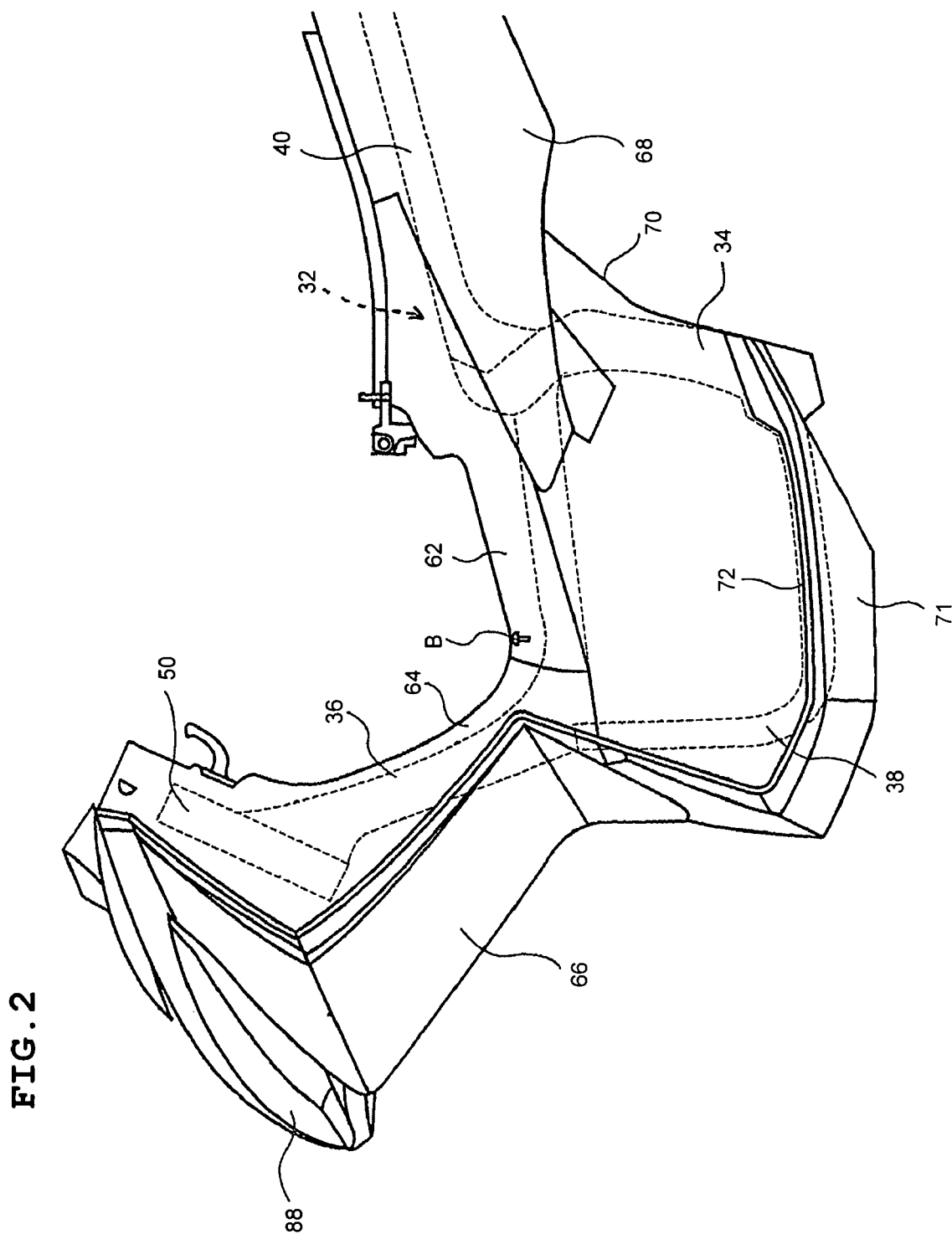
FIG. 2 illustrates a side elevation view of a major portion-of the moped of FIG. 1, with a frame of the moped being shown in phantom.
Figure 3:
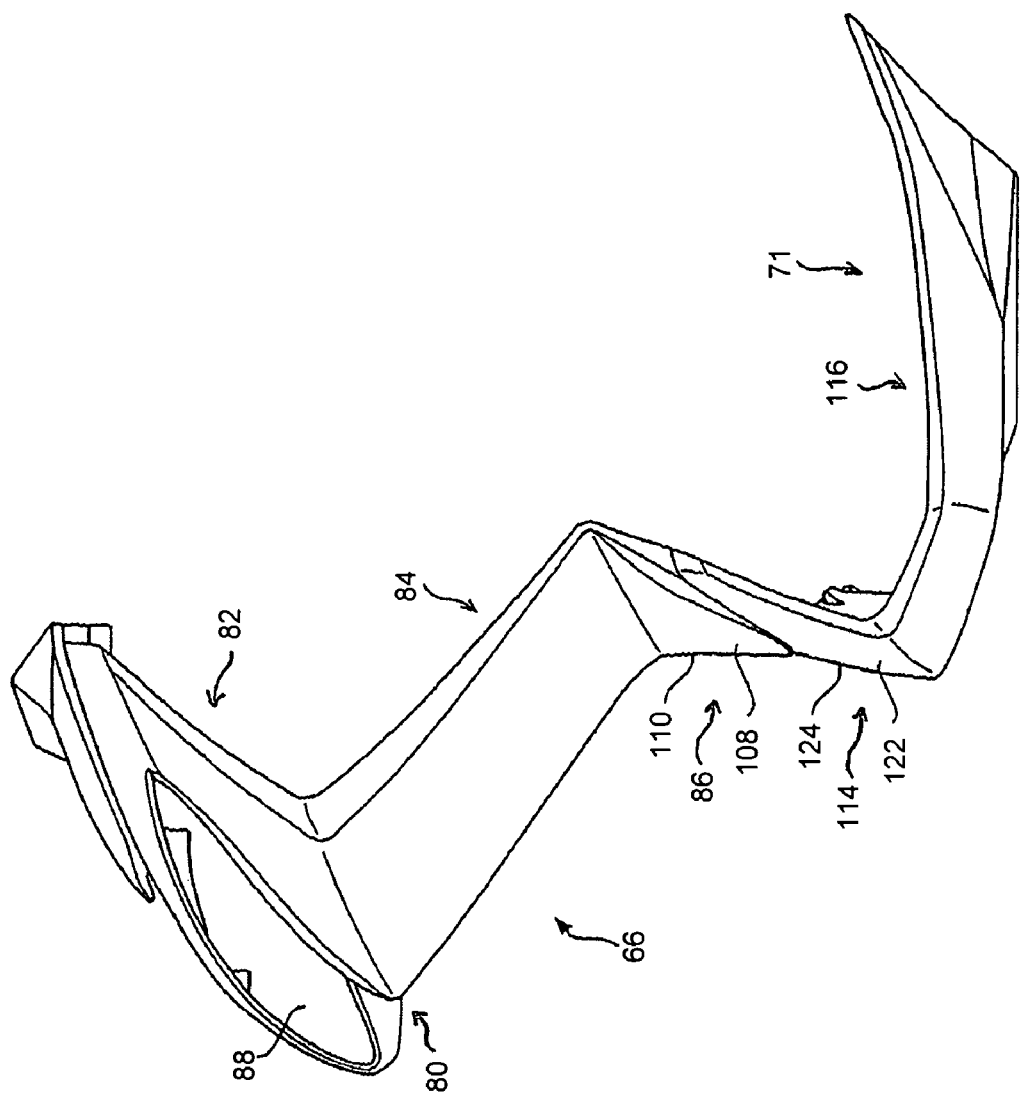
FIG. 3 illustrates a side elevation view of a front cover and an bottom cover of the moped of FIG. 1 which are coupled with each other.

With reference to FIGS. 1 and 2, an overall construction of a moped 30 configured in accordance with a preferred embodiment of the present invention is described. The moped 30 merely exemplifies one type of a wheeled vehicle. A cover coupling structure described below can be applied for other types of wheeled vehicles such as, for example, scooters.

Such applications will be apparent to those of ordinary skill in the art in light of the description herein.

As used throughout this description, the terms "forward" and "front" mean at or to the side where the leading end of the moped 30 is disposed, and the terms "rear" and "rearward" mean at or to the opposite side of the front side, unless indicated otherwise or otherwise readily apparent from the context used. Also, as used in this description, the term "horizontally" means that the subject portions, members or components extend substantially parallel to the ground when the moped 30 is upright. The term "vertically" means that portions, members or components extend substantially perpendicular to those that extend horizontally.

The moped 30 includes a frame 32 (FIG. 2) that defines a base of the moped 30. The frame 32 preferably includes a pair of right and left bracket sections 34, a main frame section 36, a sub frame section or down-tube 38, a pair of right and left seat rails 40 and several cross bars or cross members.

Both of the bracket sections 34 extend substantially vertically and are connected with each other through the cross bars. The bracket sections 34 support a power unit and a rear wheel 44. In the illustrated preferred embodiment, a combination of an internal combustion engine and a transmission, i.e., an engine unit 46 defines the power unit. An electric motor, for example, may replace the engine. The rear wheel 44 is preferably a propulsive wheel in the illustrated preferred embodiment, and the engine unit 46 powers the rear wheel 44. A center of the illustrated engine unit 46 is arranged substantially on a longitudinal center plane LCP (FIG. 4) of the moped 30 that extends vertically and from front to rear when the moped 30 is upright. A rear portion of the engine unit 46, however, is off-set to the left hand side relative to the longitudinal center plane LCP such that the rear wheel 44 and a muffler of an exhaust system for the engine may be disposed in the remaining space.

The engine unit 46 preferably swings up and down or pivots about a swing axis that extends transversely at respective bottom ends of the bracket sections 34. The rear portion of the engine unit 46 preferably accommodates the axle of the rear wheel 44 and includes an output shaft of the engine unit 46. Preferably, a suspension 48 extends between the engine unit 46 and the seat rail 40 on the left hand side of the moped 30 to absorb shock.

The main frame section 36 preferably includes a horizontal portion and a vertical portion. The horizontal portion extends forward from a top end of the bracket section 34 on the right hand side toward the longitudinal center plane LCP. The vertical portion extends upward from a forward end of the horizontal section. A head pipe 50 is welded to a top portion of the vertical portion. The head pipe 50 accommodates a steering shaft that includes a pair of front forks 52 at a bottom portion thereof. The axle of a front wheel 54 is interposed between the front forks 52. A handle bar 56 extends substantially horizontally from a top portion of the steering shaft. The handle bar 56 includes handle grips at respective ends thereof. A rider steers the moped 30 by turning the handle bar 56. The handle bar 56 preferably includes a throttling device that controls the power of the engine, and brake levers that stop the rotation of the front wheel 54 and the rear wheel 44 through braking devices.

The illustrated sub frame section 38 also includes horizontal and vertical portions. The horizontal portion preferably extends forward below the horizontal portion of the main frame section 36. The vertical portion further extends upward toward a bottom of the vertical portion of the main frame section 36 from a forward end of the horizontal section. The vertical portion of the sub frame section 38 is coupled with the vertical portion of the main frame section 36.

The seat rails 40 are preferably connected with each other through the cross bars or cross members. The seat rails 40 support a tandem seat 60. Preferably, the seat 60 is detachably fixed to the frame 32. Two riders can straddle and sit on the seat 60.

The respective bracket sections 34 are transversely spaced apart from each other and seat rails 40 are transversely spaced apart from each other so as to extend generally symmetrically on both sides of the longitudinal center plane LCP. That is, the moped 30 in the illustrated preferred embodiment is substantially symmetrical relative to the longitudinal center plane LCP. The components of the frame 32 are preferably welded together or joined by proper fasteners such as, for example, bolts and nuts.

With continued reference to FIGS. 1-4, multiple covers are provided to cover the frame 32. The covers in the illustrated preferred embodiment include a center cover 62, a leg shield 64, a front cover 66, a pair of right and left side covers 68, a pair of right and left lower covers 70 and a bottom cover 71. A pair of foot boards 72 is provided to support the feet of the rider (driver) who straddles the seat 60 and drives the moped 30.

The center cover 62 extends substantially horizontally along the horizontal portion of the main frame section 36 and front portions of the respective seat rails 40 to cover top surfaces of these portions. A forward half of the center cover 62 extends gradually upward and extends to a rear half thereof where the seat 60 is mounted. Preferably, the rear half of the center cover 62 and the side covers 68 together define an opening. A helmet storage box is preferably disposed below the opening. Thus, the rider can store his or her helmet in the storage box through the opening by removing the seat 60. The helmet storage box is attached to the seat rail 40.

The leg shield 64 preferably extends substantially vertically along the vertical portion of the main frame section 36 to cover a rear surface of the vertical portion. The leg shield 64 opposes to the knees of the rider to shield the legs of the rider. A front end of the center cover 62 overlaps a rear end of the leg shield 64. In the illustrated preferred embodiment, a fastening structure using a bolt B (FIG. 2) connects the leg shield 64 with the center cover 62 and fastens the leg shield 64 and the center cover 62 to the main frame section 36. An axis of the bolt B is preferably the sole reference position for every cover to be attached to the frame 32. The leg shield 64 is also directly attached to the main frame section 36 at other portions using other bolts.

The front cover 66 preferably extends substantially vertically along the vertical portion of the main frame section 36 to cover a front surface of the vertical portion. That is, the vertical portion of the main frame section 36 is interposed between the leg shield 64 and the front cover 66. The bottom cover 71 extends substantially vertically along the vertical portion of the sub frame section 38 and further extends substantially horizontally along the horizontal portion of the sub frame section 38 below the foot boards 72. The bottom cover 71 covers respective forward and bottom surfaces of the bracket sections 34, the sub frame section 38, the forward portion of the engine unit 46 and components for the engine unit 46 such as, for example, an air cleaner. In the illustrated preferred embodiment, the front cover 66 and the bottom cover 71 are coupled with each to prevent water, dirt and other substances kicked up by the front wheel 54 from scattering rearward or upward. The front and bottom covers 66, 71 will be described in greater detail below.

The side covers 68 preferably extend substantially horizontally along the seat rails 40 to cover respective side surfaces of the seat rails 40. The lower covers 70 preferably extend substantially vertically below the center cover 62 and above the bottom cover 71 on both sides of the moped 30 to cover respective side surfaces of the bracket sections 34, the sub frame section 38, a forward portion of the engine unit 46 and the components thereof. The center cover 62, the leg shield 64, the front cover 66, the side covers 68, the lower covers 70 and the bottom cover 71 cover substantially the entire frame 32 of the moped 30.

In the illustrated preferred embodiment, the moped 30 includes a front fender 73f and a rear fender 73r, in addition to the foregoing covers that cover the frame 32. The front fender 73f covers a top portion of the front wheel 54, and the rear fender 73r covers a rear top portion of the rear wheel 44.

The covers 62, 64, 66, 68, 70, 71, the foot board 72 and the front and rear fenders 73f, 73r are preferably made of resin. For example, the center cover 62 and the leg shield 64 are preferably made of PP (polypropylene) resin to ensure a desired amount of strength. The front cover 66 and the side covers 68 are preferably made of ABS (acrylonitorile-butadiene-styrene) resin, for example, to provide an attractive appearance. This is because the ABS resin can be coated. In general, the PP resin is stronger than the ABS resin.

A pair of foot rest stays 74 extends from the bracket sections 34 of the frame 32. Each stay 74 includes a foot rest 76 for another rider who straddles the seat 60 behind the driver. The respective foot rests 76 move between an extended position and a retracted position.

With reference to FIGS. 3-5 and 7, the front cover 66 and the bottom cover 71 are described in greater detail.

In the illustrated preferred embodiment, a center area of the front cover 66 is substantially cut away toward its bottom. That is, the front cover 66 has a configuration substantially in the shape of an inverted U or V, and preferably includes a mid portion 80, an upper portion 82, a pair of right and left lower portions 84 and a pair of right and left lower portions 86. The mid portion 80 of the front cover 66 is preferably curved so as to protrude forward. In other words, the mid portion 80 is preferably bent forward like an elbow. The upper portion 82 of the front cover 66 extends rearward and upward from the mid portion 80. The upper portion 82 preferably includes a pair of recesses in a forward portion on both sides of the longitudinal center plane LCP. Head lamp assemblies 88 are inserted into the respective recesses to be positioned at the forward-most end of the front cover 66.

Figure 4:
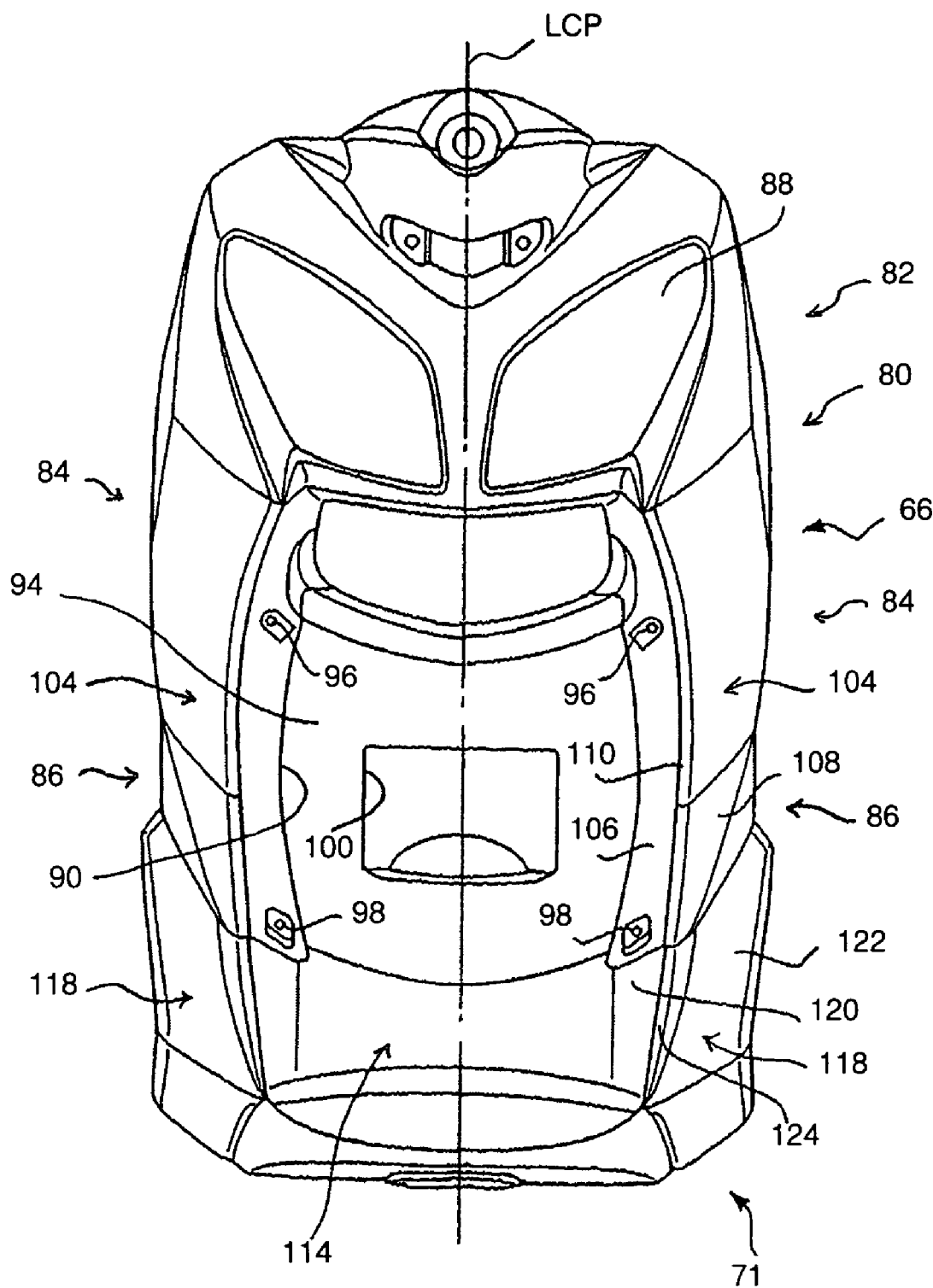
FIG. 4 illustrates a front view of the front and bottom covers coupled with each other.
Figure 5:
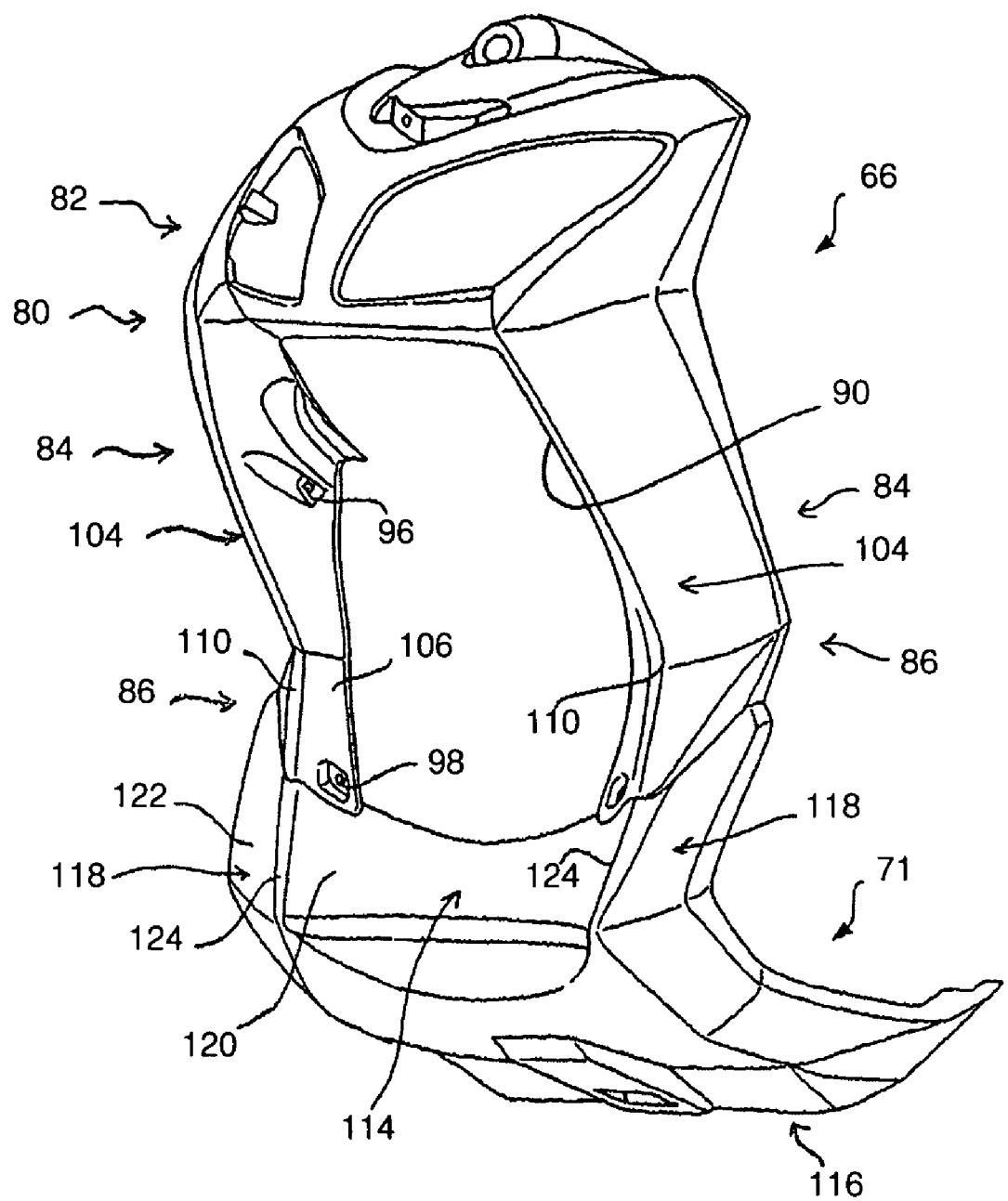
FIG. 5 illustrates a perspective view of the front and bottom covers coupled with each other.

Each lower portion 84 extends rearward and downward from the mid portion 80. Each bottom portion 86 extends downward from the bottom of each of the lower portions 86. Preferably, each bottom portion 86 is tapered downward to have a substantially triangular shape. Each bottom portion 86 is located behind the front wheel 54. As best shown in FIG. 5, the lower and bottom portions 84, 86 define an opening 90, and the bottom cover 71 is coupled with the front cover 66. The illustrated opening 90 has a substantially rectangular shape. As best shown in FIG. 4, an inner cover 94 having a shape similar to the opening 90 fills the opening 90. The illustrated inner cover 94 is slightly recessed toward the longitudinal center plane LCP. The inner cover 94 is preferably attached to the front cover 66 by bolts at bolt holes 96 of top corners of the front cover 66. The inner cover 94 is also attached to the leg shield 64 together with the front cover 66 at bolt holes 98 of bottom corners of the front cover 66. The inner cover 94 defines a smaller opening 100 through which the front forks 52 extend to the front wheel 54 from the steering shaft. The smaller opening 100 preferably has a substantially rectangular shape.

As best shown in FIG. 4, each lower and upper portion 84, 88 preferably includes a ridge 104. Each ridge 104 preferably extends substantially vertically from a top of the lower portion 84 to a bottom of the bottom portion 86 on each front surface of the lower and bottom portions 84, 86. Each ridge 104 includes an inner sloped portion 106 and an outer sloped portion 108. A ridgeline 110 extends substantially vertically between the inner and outer sloped portions 106, 108. Each inner sloped portion 106 descends toward the opening 90 from the ridgeline 110, while each outer sloped portion 108 descends outward from the ridgeline 110. Preferably, the inner sloped portion 106 is concave and the outer sloped portion 108 is convex. The surface of the inner sloped portion 106 is preferably flushed with the front surface of the inner cover 94. The foregoing bolt holes 96, 98 are disposed on the inner sloped portion 106.

The bottom cover 71 preferably includes a forward portion 114 and a rearward portion 116. The forward portion 114 extends downward from the bottom portion 88 of the front cover 66 and is curved rearward. The rearward portion 116 follows the curved forward portion 114 and extends further rearward. The forward portion 114 preferably defines another pair of ridges 118 that are transversely spaced apart from each other. Each ridge 118 includes an inner sloped portion 120 and an outer sloped portion 122. A ridgeline 124 extends substantially vertically between the inner and outer sloped portions 120, 122. Each inner sloped portion 120 descends toward a location below the opening 90 from the ridgeline 124, while each outer sloped portion 122 descends outward from the ridgeline 124. Similar to the front cover 66, the inner sloped portion 120 is concave and the outer sloped portion 122 is convex. A distance between the respective ridges 118 is approximately equal to a distance between the respective ridges 104 of the front cover 66. In addition, a configuration of each ridge 118 is substantially the same as a configuration of each ridge 104 of the front cover 66 on the same side.

Figure 7:
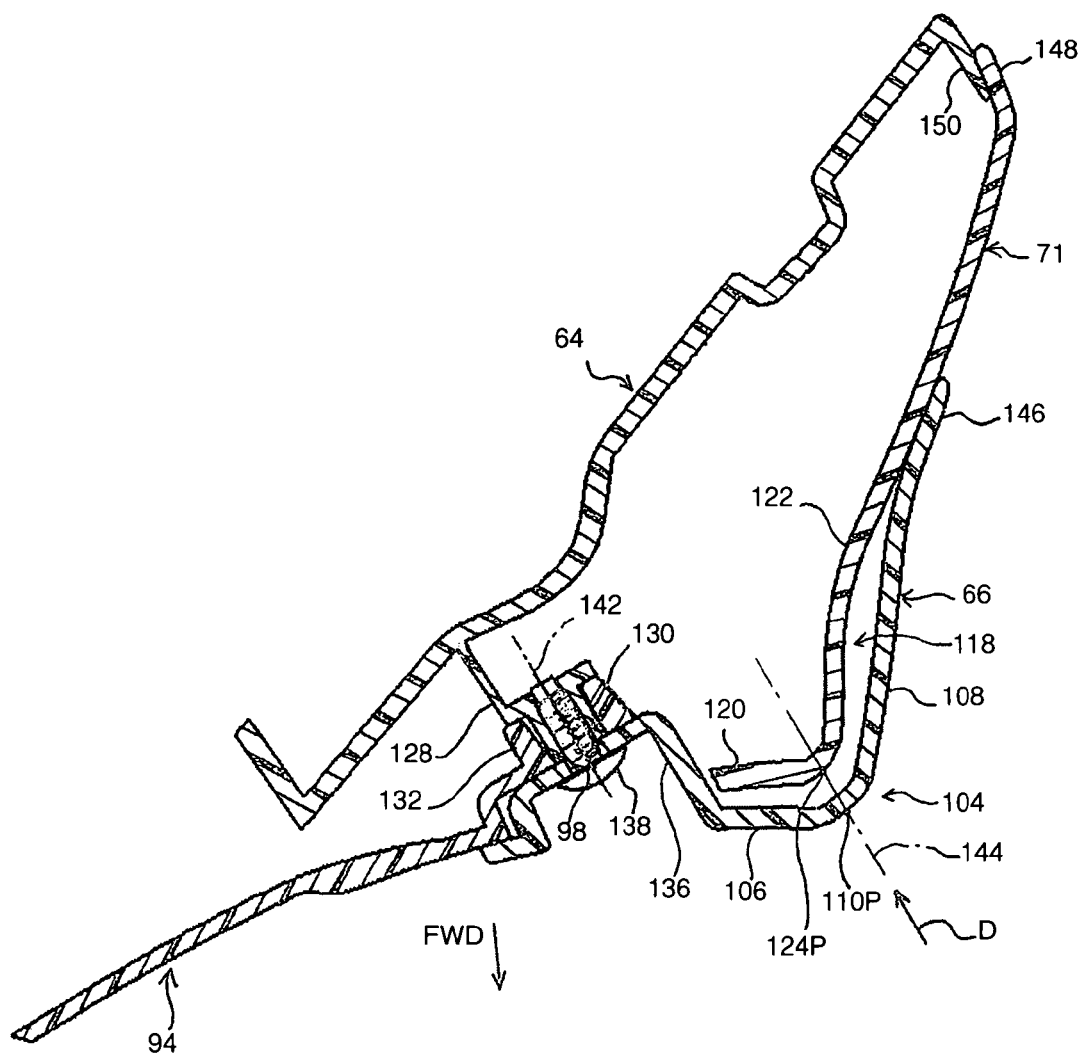
FIG. 7 illustrates a cross-sectional view of the front and bottom covers taken along the line 7-7 of FIG. 6.

In the illustrated preferred embodiment, the respective bottom portions 86 of the front cover 66 overlap the forward portion 114 of the bottom cover 71. The respective ridges 104 of the front cover 66 lie on top of the respective ridges 118 of the bottom cover 71. As best shown in FIG. 7, the front cover 66 is arranged onto the bottom cover 71 in a direction D such that a point of the ridgeline 110P of the front cover 66 and a point of the ridgeline 124P which is located on substantially the same level as the point of the ridgeline 110P together lie on a line 144 that extends in the direction D.

The ridges 104, 118 substantially surround a rear portion of the front wheel 54. Thus, water or first kicked up by the front wheel 54 is directed forward along the concave surfaces of the ridges 104, 118. That is, the ridges 104, 118 help to prevent the water, dirt or other substances from scattering rearward or upward.

Because each ridge 118 is preferably disposed at approximately the same location as the associated ridge 104 and has substantially the same configuration as the associated ridge 104, the front and bottom covers 66, 71 ideally meet each other without any space (or opening) therebetween. However, in reality, the front cover 66 and the bottom cover 71 may have dimensional variations due to tolerance that occur during production processes of the covers 66, 71. This is because the covers 66, 71 are made of resin. Such dimensional variations due to tolerance may create spaces between the overlapped portions of the front and bottom covers 66, 71. In the illustrated preferred embodiment, the front and bottom covers 66, 71 are coupled with each other using an improved coupling structure described below.

With reference to FIGS. 3-11, the improved coupling structure is described. In the illustrated preferred embodiment, the coupling structure is provided at two portions where the front and bottom covers 66, 71 are overlapped. The two structures are symmetrical with each other relative to the longitudinal center plane LCP. Thus, one of the structures on the left hand side described below represents both of the structures.

As noted above, in the illustrated preferred embodiment, the bottom portion 86 of the front cover 66 and the bottom portion of the inner cover 94 are attached together to the leg shield 64 using the coupling structure. Because the bottom portion 86 of the front cover 66 overlaps the forward portion 114 of the bottom cover 71, the bottom cover 71 is pressed toward the leg shield 64 by the front cover 66. Other portions of the bottom cover 71 are directly attached to the leg shield 64 or the frame 32, although the other portions are not shown.

Figure 6:
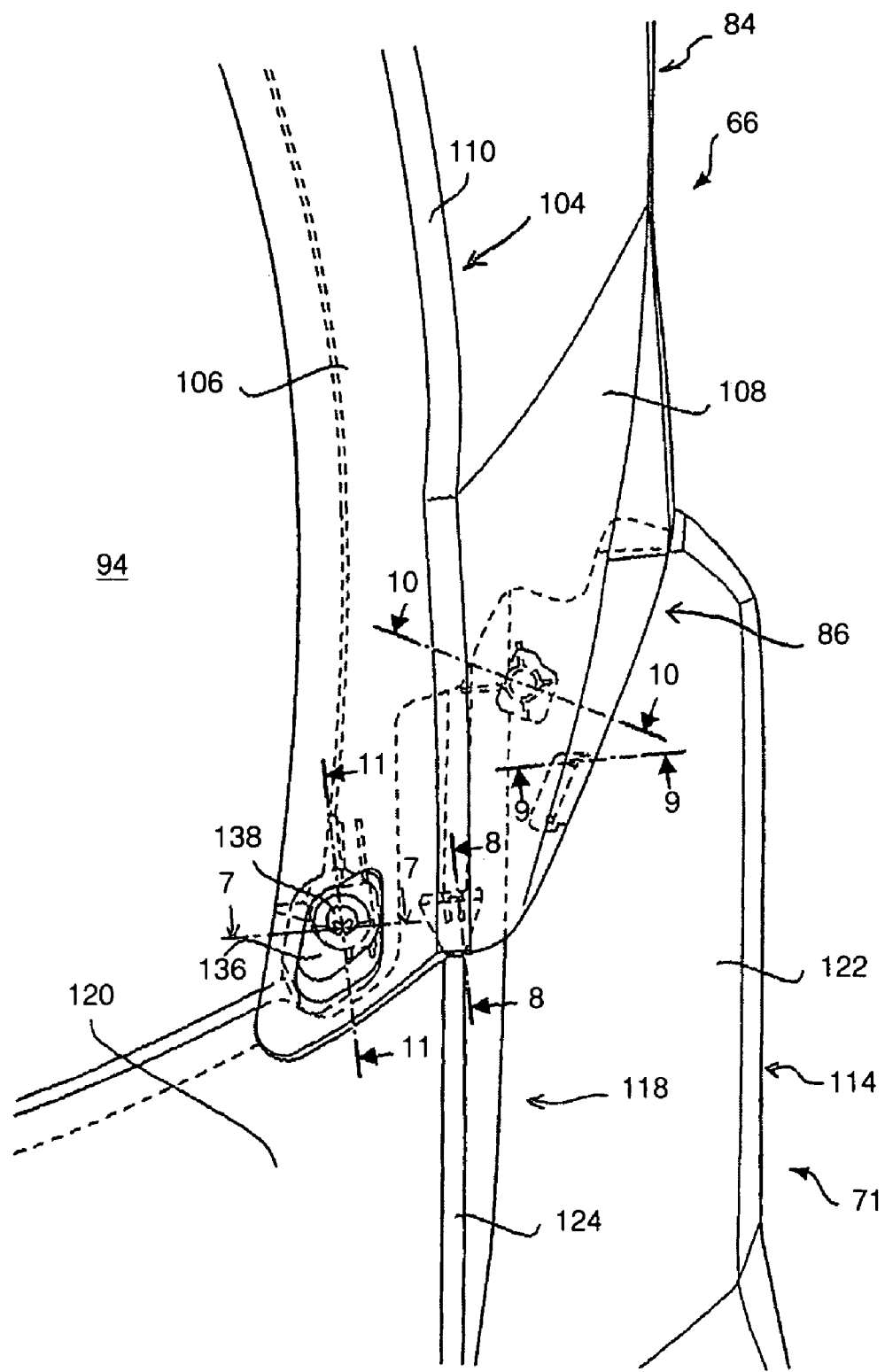
FIG. 6 illustrates an enlarged front view of the front and bottom covers coupled with each other showing overlapped portions thereof on the left side of the moped.
Figure 11:
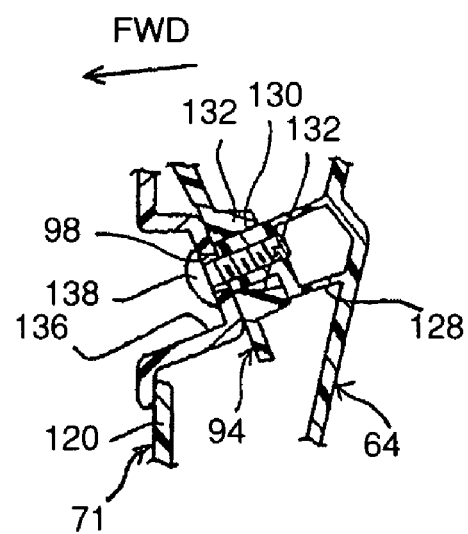
FIG. 11 illustrates a cross-sectional view of the front and bottom covers taken along the line 11-11 of FIG. 6.

With reference to FIGS. 6, 7 and 11, a stay 128 preferably extends forward and slightly downward from the leg shield 64. The arrow FWD of FIGS. 7 and 11 indicates the forward direction in these figures. The stay 128 preferably includes a boss 130 extending further forward. The illustrated inner cover 94 also includes a boss 132. An inner diameter of the boss 132 is larger than an outer diameter of the boss 130. Thus, the boss 130 of the stay 128 fits into the boss 132 of the inner cover 94. The front cover 66 includes a recess 136 in an area of the inner sloped portion 106. The recess 136 extends rearward toward the stay 128. The bolt hole 98 is defined at a bottom surface (i.e., vertical surface) of the recess 136. The bottom surface of the recess 136 abuts against a tip end of the boss 130 of the stay 128. Thus, the boss 132 of the inner cover 94 is interposed between the bottom surface of the recess 136 and the stay 128.

A bolt 138, which is an exampled of a fastener, is inserted into the boss 130 of the stay 128 to couple the front cover 66 together with the inner cover 94 to the stay 128. Because the leg shield 64 is affixed to the horizontal portion of the main frame 36 by the bolt B, the front cover 66 and the inner cover 94 are indirectly attached to the main frame 36 via the leg shield 64. That is, the leg shield 64 is an intermediate member for the front and inner covers 66, 94 to be attached to the frame 32. An axis 142 of the bolt 138 extends substantially parallel to the line 144 that includes both of the point 110P of the ridgeline 110 and the point 124P of the ridgeline 124. In the illustrated preferred embodiment, the line 144 does not extend parallel to the longitudinal center plane LCP but extends forward and away from the longitudinal center plane LCP.

Because the bolt 138 fastens the front cover 66 to the leg shield 64 in the direction in which the front cover 66 is placed onto the bottom cover 71, an end portion 146 of the front cover 66 securely abuts against a forward surface of the bottom cover 71 and firmly presses the bottom cover 71 toward the leg shield 64. Thus, no space exists between the end portion 146 of the front cover 66 and the forward surface of the bottom cover 71. In the illustrated preferred embodiment, an outer-most end 148 of the bottom cover 71 abuts against a forward extending end 150 of the leg shield 64. Because the outer-most end 148 securely engages the forward extending end 150 by being firmly pressed against the forward extending end 150, no space exists between the outer-most end 148 and the forward extending end 150.

As described above, in the illustrated preferred embodiment, the chances of a space existing between the overlapped portions of the front and bottom covers 66, 71 are greatly reduced. As a result, the attractive appearance of the moped 30 is maintained. In addition, no substances can enter an inside space between the front and bottom covers 66, 71. Because the illustrated bolt hole 98 is located in the area of the inner sloped portion 106 and, in addition, at the bottom of the recess 136, the bolt 138 is virtually invisible from a location on each side of the moped 30. The arrangement thus further maintains the attractive appearance of the moped 30. The recess 136 may be omitted if the ridges 104, 118 sufficiently obscure the view of the bolt 138.

In order to promote some of the advantages described above, the illustrated coupling structure includes further improvements.

Figure 8:
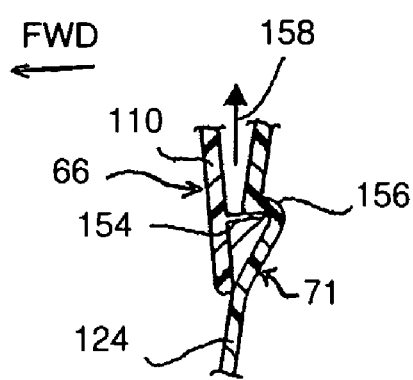
FIG. 8 illustrates a cross-sectional view of the front and bottom covers taken along the line 8-8 of FIG. 6.

With reference to FIGS. 6 and 8, the front cover 66 preferably includes an engaging projection 154 extending rearward on the ridgeline 110. The arrow FWD of FIG. 8 indicates the forward direction in this figure. The bottom cover 71 preferably includes a receiving portion 156 to receive the engaging projection 154 on the ridgeline 124. The engaging projection 154 engages the receiving portion 156 and is located at an engaging position as shown in FIG. 8 when the front cover 66 and the bottom cover 71 are coupled with each other. The engaging projection 154 is disposed higher than the engaging position unless the receiving portion 156 receives the engaging projection 154. That is, the engaging projection 154 is biased in a direction indicated by the arrow 158. The direction 158 is preferably different from the direction D of FIG. 7. The illustrated direction 158 is substantially perpendicular to the direction D. In other words, a bias force is upwardly exerted onto the engaging projection 154. The bias force 158 always presses the front cover 66 to the bottom cover 71 in the upward direction (i.e., the direction 158).

Figure 9:
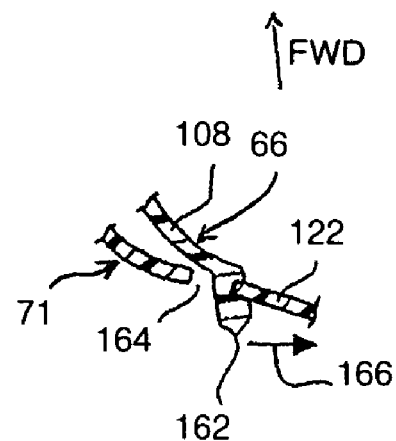
FIG. 9 illustrates a cross-sectional view of the front and bottom covers taken along the line 9-9 of FIG. 6.

With reference to FIGS. 6 and 9, the front cover 66 preferably includes an engaging projection 162 extending rearward in an area of the outer sloped portion 108. The arrow FWD of FIG. 9 indicates the forward direction in this figure.

The bottom cover 71 preferably includes a receiving aperture 164 arranged to receive the engaging projection 162. The engaging projection 162 engages the receiving aperture 164 and is located at an engaging position as shown in FIG. 9 when the front cover 66 and the bottom cover 71 are coupled with each other. The engaging projection 162 is located further outside than the engaging position unless the receiving aperture 164 receives the engaging projection 162. That is, the engaging projection 162 is biased in a direction indicated by the arrow 166. The direction 166 is preferably different from the direction D of FIG. 7. The illustrated direction 166 is substantially perpendicular to the direction D. In other words, a bias force indicated by the arrow 166 is outwardly exerted onto the engaging projection 162. Thus, the bias force 166 presses the front cover 66 toward the bottom cover 71 in the outward direction (i.e., the direction 166).

Figure 10:
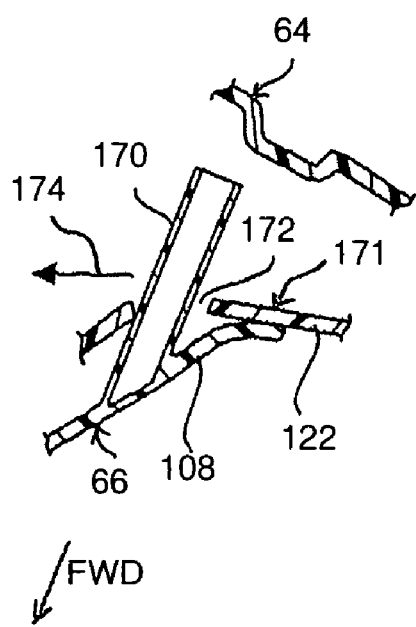
FIG. 10 illustrates a cross-sectional view of the front and bottom covers taken along the line 10-10 of FIG. 6.

With reference to FIGS. 6 and 10, the front cover 66 preferably includes a columnar projection 170 extending rearward in an area of the outer sloped portion 108. The arrow FWD of FIG. 10 indicates the forward direction in this figure. The length of the columnar projection 170 is preferably determined such that a tip portion of the projection 170 does not extend to the leg shield 64. The bottom cover 71 preferably includes a receiving aperture 172 to receive the columnar projection 170. The columnar projection 170 engages the receiving aperture 172 and is located at an engaging position as shown in FIG. 10 when the front cover 66 and the bottom cover 71 are coupled with each other. The columnar projection 170 is located further inside than the engaging position unless the receiving aperture 172 receives the columnar projection 170. That is, the columnar projection 170 is biased in a direction indicated by the arrow 174. The direction 174 is preferably different from the direction D of FIG. 7. In other words, a bias force indicated by the arrow 174 is inwardly exerted onto the columnar projection 170. The bias force 174 always presses the front cover 66 against the bottom cover 71 in the inward direction (i.e., the direction 174).

In the illustrated preferred embodiment, the front cover 66 is pressed against the bottom cover 71 in different directions by the bias forces. The bias forces are exerted on the ridges 104, 118. None of the bias forces are parallel to the line 144. Thus, the front and bottom coves 66, 71 securely overlap each other and the chances that a space will exist between the overlapped portions are further reduced.

All or a portion of the projections 154, 162, 170 may extend from the bottom cover 71 if the associated receiving portion 156 and receiving apertures 164, 172 are provided on the front cover 64.

The cover coupling structure described above can be applied to the front or rear fender 73f, 73r in some arrangements.

Although the present invention has been disclosed in the context of preferred embodiments, it will be understood by those skilled in the art that the present invention extends beyond the specifically disclosed preferred embodiments to other alternative embodiments and/or uses of the invention and obvious modifications and equivalents thereof.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

What is claimed is:

1. A vehicle comprising:
    front and rear wheels;
    a frame arranged to support the wheels;
    first and second covers arranged to cover at least a portion of the frame; the first cover including a first ridge, a first inner sloped portion, and a first outer sloped portion integral with each other such that the first inner sloped portion and the first outer sloped portion extend from opposite sides of the first ridge; the second cover including a second ridge, a second inner sloped portion, and a second outer sloped portion integral with each other such that the second inner sloped portion and the second outer sloped portion extend from opposite sides of the second ridge; the first and second covers being arranged to overlap each other such that the first and second ridges overlap each other, the first and second inner sloped portions overlap each other, and the first and second outer sloped portions overlap each other; and none of the first and second ridges, the first and second inner sloped portions, and the first and second outer sloped portions, respectively, are fastened to each other; and
    a fastener fastening the second cover to the frame in a first clamping direction in which the second cover is placed onto the first cover; wherein
    the first ridge includes a first ridgeline spaced inward from an edge of the first cover, the first ridgeline having a first convex shape; and
    the second ridge includes a second ridgeline spaced inward from an edge of the second cover, the second ridgeline having a second convex shape having substantially the same configuration as the first convex shape.

2. The wheeled vehicle as set forth in claim 1, wherein the fastener has an axis extending in the first direction substantially parallel to a line on which both of a first point of the first ridgeline and a second point of the second ridgeline are located.

3. The vehicle as set forth in claim 2, wherein the fastener is disposed in an area of at least one of the sloped portions of the first and second ridges.

4. The vehicle as set forth in claim 1, wherein the fastener is disposed in an area of at least one of the sloped portions of the first and second ridges.

5. The vehicle as set forth in claim 4, wherein the fastener is disposed closer to a longitudinal center plane of the vehicle than the ridgelines of the first and second ridges, the longitudinal center plane extends vertically and from front to rear of the vehicle.

6. The vehicle as set forth in claim 5, wherein the first and second ridges extend substantially vertically.

7. The vehicle as set forth in claim 6, wherein at least one of the first cover and the second cover extends in front of a portion of the frame.

8. The vehicle as set forth in claim 4, wherein said at least one of the sloped portions that includes the area of said at least one of the sloped portions of the first and second ridges is in the vicinity of the front wheel.

9. The vehicle as set forth in claim 1, further comprising an intermediate member attached to the frame, at least one of the first cover and the second cover is fastened to the intermediate member by the fastener.

10. The vehicle as set forth in claim 1, wherein one of the first cover and the second cover includes a first engaging portion that extends in the first direction, the other of the first cover and the second cover includes a second engaging portion that engages the first engaging portion in a second direction that is different from the first direction.

11. The vehicle as set forth in claim 10, wherein the first and second engaging portions are biased toward each other in the second direction that is different from the first direction.

12. The vehicle as set forth in claim 10, wherein one of the first cover and second cover includes a third engaging portion that extends in the first direction, the other of the first cover and the second cover includes a fourth engaging portion that engages the third engaging portion in a third direction that is different from the first and second directions.

13. A vehicle comprising:
front and rear wheels;
a frame arranged to support the wheels;
first and second covers arranged to cover at least the frame, the first cover including a set of first ridges and the second cover including a set of second ridges; a first inner sloped portion and a first outer sloped portion integral with each other such that the first inner sloped portion and the first outer sloped portion extend from opposite sides of the set of first ridges; a second inner sloped portion and a second outer sloped portion integral with each other such that the second inner sloped portion and the second outer sloped portion extend from opposite sides of the set of second ridges; the first and second covers being arranged to overlap each other such that the set of first and second ridges overlap each other, the first and second inner sloped portions overlap each other, and the first and second outer sloped portions overlap each other; and none of the set of first and second ridges, the first and second inner sloped portions, and the first and second outer sloped portions, respectively, are fastened to each other; and
a plurality of fasteners fastening the second cover to the frame in a clamping direction in which the second cover is placed onto the first cover; wherein
the first set of ridges include a first ridgeline spaced inward from an edge of the first cover, the first ridgeline having a first convex shape; and
the second set of ridges include a second ridgeline spaced inward from an edge of the second cover, the second ridgeline having a second convex shape having substantially the same configuration as the first convex shape.

14. The vehicle as set forth in claim 13, wherein a center of the front wheel is located on a longitudinal center plane of the vehicle that extends vertically and from front to rear of the vehicle, and the respective sets of the first and second ridges are spaced apart from each other such that the front wheel is interposed therebetween.

15. The vehicle as set forth in claim 14, wherein the first and second covers are disposed behind the front wheel, and the set of first ridges and the set of second ridges extend substantially vertically and protrude in a forward direction.

16. The vehicle as set forth in claim 13, wherein the first and second sets of ridges substantially surround a rear portion of the front wheel.

17. The vehicle as set forth in claim 14, wherein the respective sets of the first and second ridges are symmetrically disposed with each other relative to the longitudinal center plane.

* * * * *